United States Patent
Tai et al.

(10) Patent No.: US 6,500,680 B1
(45) Date of Patent: Dec. 31, 2002

(54) SERVICE CODE SYSTEM AND METHOD FOR SCHEDULING FABRICATION FACILITY UTILIZATION

(75) Inventors: Yu-Fong Tai, Hsinchu (TW); Chun-Yi Tsai, Kaohsiung (TW); Chao-Hsin Chang, Hsin-Chu (TW)

(73) Assignee: Taiwan Semiconductor Manufacturing Company, Ltd, Hsin Chu (TW)

( * ) Notice: Subject to any disclaimer, the term of this patent is extended or adjusted under 35 U.S.C. 154(b) by 0 days.

(21) Appl. No.: 09/933,682

(22) Filed: Aug. 20, 2001

(51) Int. Cl.$^7$ .............................................. H01L 21/00
(52) U.S. Cl. ......................................................... 438/6
(58) Field of Search ..................... 250/339.08; 364/468, 364/490; 438/14, 6

(56) References Cited

U.S. PATENT DOCUMENTS

| | | | | |
|---|---|---|---|---|
| 5,469,361 A | * | 11/1995 | Moyne | 364/468 |
| 5,900,633 A | * | 5/1999 | Solomon | 250/339.08 |
| 5,971,585 A | | 10/1999 | Dangat et al. | |

* cited by examiner

Primary Examiner—John F. Niebling
Assistant Examiner—Andre C Stevenson
(74) Attorney, Agent, or Firm—Tung & Associates

(57) ABSTRACT

Within both a system for managing a work-in-process (WIP) workload within a fabrication facility and a method for managing the work-in-process (WIP) workload within the fabrication facility, there is determined from an overall routing sequence for fabricating the work-in-process (WIP) workload within the fabrication facility a series of routing sub-sequences which correspond with a series of service codes. By using the series of service codes for routing the work-in-process (WIP) workload within the fabrication facility there may be realized operational efficiencies when fabricating the work-in-process (WIP) workload within the fabrication facility.

8 Claims, 2 Drawing Sheets

| Microelectronic Fabrication Facility Routing |||||
|---|---|---|---|
| Lot id | Product Code | Service Code | Routing Code |
| D300678.1 | TM3562A-NBP4 | 04 | 002635 |
| D300679.1 | TM3562A-NBP5 | 04 | 002644 |
| D300680.1 | TM3562A-NBP4 | 02 | 002644 |

*Figure 2A*

| Service Code Definitions ||
|---|---|
| 01 | WF |
| 02 | WF+CP |
| 03 | WF+CP+AS |
| 04 | WF+CP+AS+FT |
| 05 | WF+AS+FT |
| 06 | WF+AS |
| 07 | WF+CP+CF |
| 08 | WF+CP+CF+AS |
| 09 | WF+CP+CF+AS+FT |
| 10 | WF+CF+CP |
| 11 | WF+CF+CP+AS |
| 12 | WF+BP |
| 13 | BP |

*Figure 2B*

| Fabrication Operation Definitions ||
|---|---|
| BK | Bank |
| CO | Code/option |
| CU | Copper |
| WF | Wafer process |
| CP | Wafer sorting |
| AS | Assembling |
| FT | Final test |
| CF | Color filter |
| BP | Bumping |

*Figure 2C*

SERVICE CODE SYSTEM AND METHOD FOR SCHEDULING FABRICATION FACILITY UTILIZATION

BACKGROUND OF THE INVENTION

1. Field of the Invention

The present invention relates generally to systems and methods for scheduling fabrication facility utilization. More particularly, the present invention relates to systems and methods for efficiently scheduling fabrication facility utilization.

2. Description of the Related Art

Microelectronic fabrications are formed from microelectronic substrates over which are formed patterned microelectronic conductor layers which are separated by microelectronic dielectric layers.

As microelectronic fabrication integration levels have increased and microelectronic device and patterned microelectronic conductor layer dimensions have decreased, so also has increased the complexity of microelectronic fabrication processing methods and microelectronic fabrication processing facilities which are employed for fabricating microelectronic fabrications. The increased complexity of microelectronic fabrication processing methods and microelectronic fabrication processing facilities which are employed for fabricating microelectronic fabrications derives in-part from: (1) the length (i.e., total number of process steps) of a typical microelectronic fabrication process description; along with (2) the variety of microelectronic fabrication process tools which is typically employed for fabricating a typical microelectronic fabrication; further in conjunction with (3) the variety of individual microelectronic fabrications (i.e., part numbers) which is typically fabricated within a typical microelectronic fabrication processing facility; still further in conjunction with (4) any specific microelectronic fabrication tool routing requirements which may be encountered when fabricating a particular microelectronic fabrication or a particular class of microelectronic fabrications within either a single microelectronic fabrication processing facility or a plurality of microelectronic fabrication processing facilities.

Further contributing to the complexity of microelectronic fabrication processing methods and microelectronic fabrication processing facilities is the generally distributed (i.e., non-linear) nature of microelectronic fabrication processing methods and microelectronic fabrication processing facilities, which further allows for various production priorities and dispatching rules when fabricating multiple microelectronic fabrication part numbers within either individual microelectronic fabrication processing facilities or multiple microelectronic fabrication processing facilities. Such varied production priorities and dispatching rules in-turn often provide difficulties in management of microelectronic fabrication work-in-process (WIP) workload within microelectronic fabrication processing facilities.

In light of the foregoing, it is thus desirable in the art of microelectronic fabrication to provide systems and methods for efficiently managing microelectronic fabrication work-in-process (WIP) workload within microelectronic fabrication facilities.

It is towards the foregoing object that the present invention is directed.

Various systems and methods have been disclosed in the arts of manufacturing and fabrication for managing fabrication workload within fabrication facilities, such as but not limited to microelectronic fabrication work-in-process (WIP) workload within microelectronic fabrication facilities.

Included among the systems and methods, but not limiting among the systems and methods, are methods disclosed within Dangat et al., in U.S. Pat. No. 5,971,585 (a method for optimizing within a fabrication facility, such as but not limited to a microelectronic fabrication facility, fabrication assets with respect to fabrication demands, such as to determine which fabrication demands may be met, and thus manage a workload within the fabrication facility, by employing a best can do (BCD) algorithm for matching the fabrication assets with respect to fabrication demands, where the best can do (BCD) algorithm comprises a forward implode feasible plan solver which may alternatively employ either heuristic decision technology or linear programming decision technology). The teachings of the foregoing reference are incorporated herein fully by reference.

Desirable in the art of microelectronic fabrication are additional systems and methods which may be employed for efficiently managing microelectronic fabrication work-in-process (WIP) workload within microelectronic fabrication facilities.

It is towards the foregoing object that the present invention is directed.

SUMMARY OF THE INVENTION

A first object of the present invention is to provide a system and a method for managing microelectronic fabrication work-in-process (WIP) workload within a microelectronic fabrication facility.

A second object of the present invention is to provide a system and a method in accord with the first object of the present invention, wherein the system and the method are readily commercially implemented.

In accord with the objects of the present invention, there is provided by the present invention a system and a method for managing within a fabrication facility, such as but not limited to a microelectronic fabrication facility, a work-in-process (WIP) workload, such as but not limited to a microelectronic fabrication work-in-process (WIP) workload.

To practice the method of the present invention, there is first provided a fabrication facility comprising a plurality of fabrication tools which performs a corresponding plurality of fabrication functions. There is then defined for the fabrication facility an overall routing sequence for fabricating a work-in-process (WIP) workload within the fabrication facility. There is then defined from the overall routing sequence a series of routing sub-sequences defined by a series of service codes, where a routing sub-sequence and a corresponding service code define a sub-plurality of fabrication tools which performs a corresponding sub-plurality of fabrication functions. Finally, there is then fabricated within the fabrication facility a work-in-process (WIP) workload which is routed while employing at least one service code.

The method of the present invention contemplates a system, and in particular a computer implemented system, which may be employed for practicing the method of the present invention.

The present invention provides a system and a method for managing within a fabrication facility, such as but not limited to a microelectronic fabrication facility, a work-in-process (WIP) workload, such as but not limited to a microelectronic fabrication work-in-process (WIP) workload.

The present invention realizes the foregoing object by employing within a fabrication facility comprising a plurality of fabrication tools which performs a corresponding plurality of fabrication functions an overall routing sequence for fabricating a work-in-process (WIP) workload within the fabrication facility. In addition, within the present invention, there is defined from the overall routing sequence a series of routing sub-sequences defined by a series of service codes. Within the present invention a routing sub-sequence and a corresponding service code define a sub-plurality of fabrication tools which performs a corresponding sub-plurality of fabrication functions with respect to a work-in-process (WIP) workload within the fabrication facility. Finally, a work-in-process (WIP) workload is fabricated within the fabrication facility while employing at least one service code.

The system of the present invention and the method of the present invention are readily commercially implemented. As will be illustrated in greater detail within the context of the Description of the Preferred Embodiment which follows, the present invention employs fabrication assets, fabrication resources and fabrication systems which are either generally employed within the art of microelectronic fabrication or readily adapted to the art of microelectronic fabrication. Since it is thus a specific operational methodology of fabrication assets, fabrication resources and fabrication systems which provides at least in part the present invention, rather than the existence of fabrication assets, fabrication resources and fabrication systems which provides the present invention, the system of the present invention and the method of the present invention are readily commercially implemented.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein:

FIG. 2A, FIG. 2B and FIG. 2C show a series of Tables illustrating a Microelectronic Fabrication Facility Routing, a series of Service Code Definitions and a series of Factory Operations Definitions in accord with the present invention.

DESCRIPTION OF THE PREFERRED EMBODIMENTS

Figure 1:
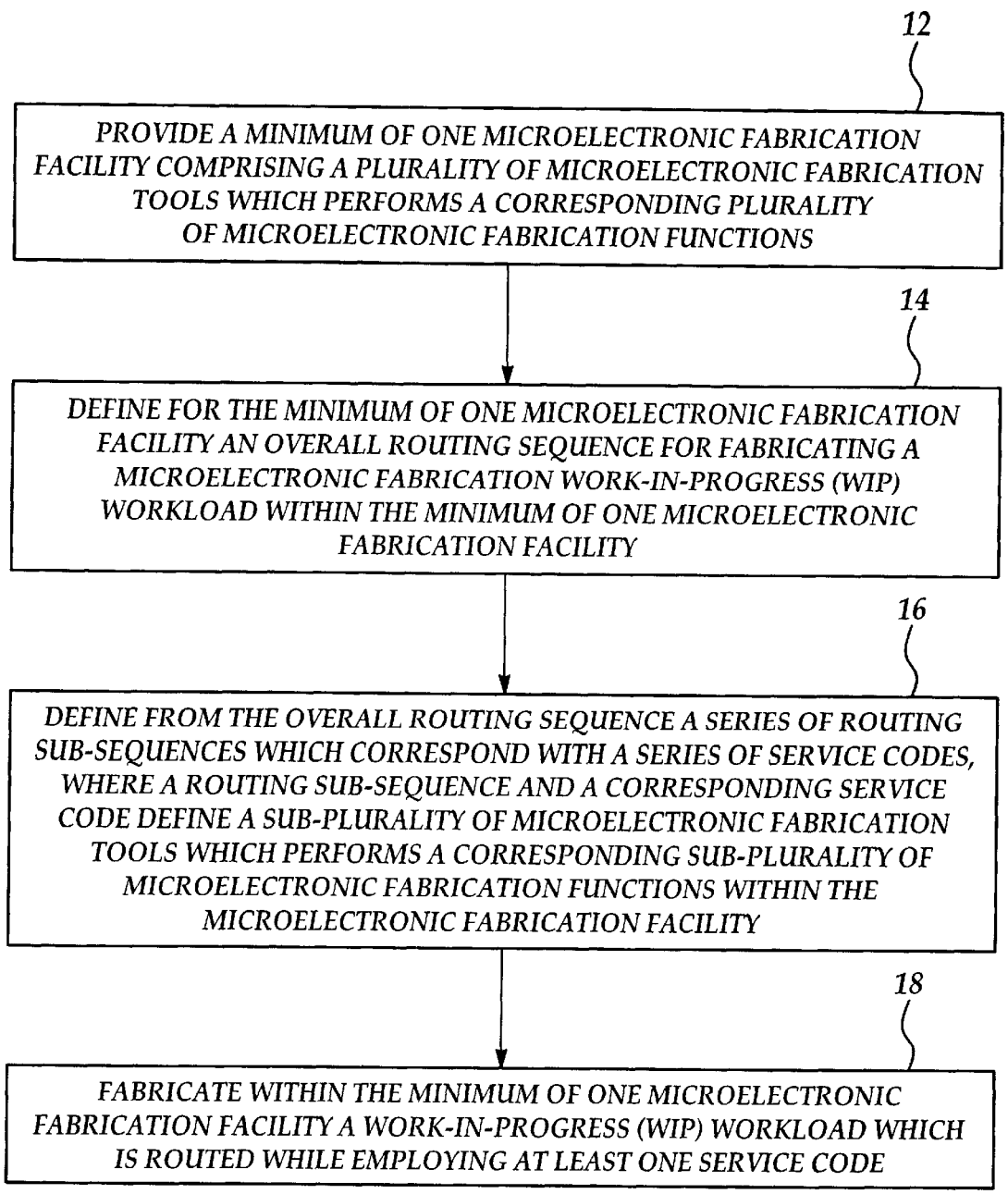
FIG. 1 shows a schematic process flow diagram illustrating the method of the present invention.

The present invention provides a system and a method for managing within a fabrication facility, such as but not limited to a microelectronic fabrication facility, a work-in-process (WIP) workload, such as but not limited to a microelectronic fabrication work-in-process (WIP) workload.

The present invention realizes the foregoing object by employing within a fabrication facility comprising a plurality of fabrication tools which performs a corresponding plurality of fabrication functions an overall routing sequence for fabricating a work-in-process (WIP) workload within the fabrication facility. In addition, within the present invention, there is defined from the overall routing sequence a series of routing sub-sequences defined by a series of service codes. Within the present invention a routing sub-sequence and a corresponding service code defines a sub-plurality of fabrication tools which performs a corresponding sub-plurality of fabrication functions with respect to a work-in-process (WIP) workload within the fabrication facility. Finally, within the present invention, a work-in-process (WIP) workload is routed within the fabrication facility while employing at least one service code.

Although the present invention provides particular value within the context of managing a microelectronic fabrication work-in-process (WIP) workload within a microelectronic fabrication facility, and more particularly within the context of managing a semiconductor integrated circuit microelectronic fabrication work-in-process (WIP) workload within a semiconductor integrated circuit microelectronic fabrication facility, the present invention may also be employed for managing work in process (WIP) workload within fabrication facilities including but not limited to electronic fabrication facilities, microelectronic fabrication facilities, mechanical fabrication facilities and chemical fabrication facilities, particularly under circumstances where the fabrication facilities are nominally distributed fabrication facilities which fabricate multiple part numbers of fabrications while employing multiple process descriptions and multiple fabrication tools within the context of multiple fabrication and production priorities. More specifically with respect to fabrication of microelectronic fabrications, the system of the present invention and method of the present invention may be employed for fabricating microelectronic fabrications including but not limited to integrated circuit microelectronic fabrications, ceramic substrate microelectronic fabrications, solar cell optoelectronic microelectronic fabrications, sensor image array optoelectronic microelectronic fabrications and display image array optoelectronic microelectronic fabrications.

Referring now to FIG. 1, there is shown a schematic process flow diagram illustrating the results of progressive stages in fabricating a microelectronic fabrication in accord with a preferred embodiment of the present invention.

Referring again to FIG. 1, and in accord with the text which corresponds with reference numeral 12, there is first provided a minimum of one microelectronic fabrication facility comprising a plurality of microelectronic fabrication tools which performs a corresponding plurality of microelectronic fabrication functions.

As noted above, while the preferred embodiment of the present invention is directed most particularly towards fabricating semiconductor integrated circuit microelectronic fabrication work-in-process (WIP) workloads within semiconductor integrated circuit microelectronic fabrication facilities, the present invention may also be employed within the context of fabricating other microelectronic fabrications within other microelectronic fabrication facilities, as well as fabricating fabrications other than microelectronic fabrications within facilities other than microelectronic fabrication facilities.

Nonetheless, within the preferred embodiment of the present invention with respect to the plurality of microelectronic fabrication tools which performs the corresponding plurality of microelectronic fabrication functions, the plurality of microelectronic fabrication tools which performs the corresponding plurality of microelectronic fabrication functions may include, but is not limited to microelectronic fabrication processing tools, microelectronic fabrication inspection tools and microelectronic fabrication testing tools.

Referring again to FIG. 1, and in accord with the text which corresponds with reference numeral 14, there is then defined for the minimum of one microelectronic fabrication facility an overall routing sequence for fabricating a microelectronic fabrication work-in-process (WIP) workload within the minimum of one microelectronic fabrication facility.

Within the preferred embodiment of the present invention, the overall routing sequence will typically and preferably employ each type of microelectronic fabrication tool (i.e., microelectronic fabrication processing type tools, microelectronic fabrication inspection type tools and microelectronic fabrication test type tools) within the plurality of microelectronic fabrication tools within the microelectronic fabrication facility, but not necessarily each microelectronic fabrication tool within the plurality of microelectronic fabrication tools within the microelectronic fabrication facility, in particular when there are multiple microelectronic fabrication tools of a particular type within the microelectronic fabrication facility.

Referring again to FIG. 1, and in accord with the text which corresponds with reference numeral 16, there is then defined from the overall routing sequence a series of routing sub-sequences which correspond with a series of service codes. Within the present invention, a routing sub-sequence and a corresponding service code define a sub-plurality of microelectronic fabrication tools which performs a corresponding sub-plurality of microelectronic fabrication functions within the microelectronic fabrication facility. Within the present invention, the sub-plurality of microelectronic fabrication tools may consist of one microelectronic fabrication tool and the sub-plurality of microelectronic fabrication functions may similarly consist of one microelectronic fabrication function.

Within the context of the present invention, and in accord with the above, the sub-plurality of microelectronic fabrication functions may comprise, for example and without limitation: (1) a specific microelectronic fabrication processing function; in conjunction with (2) a specific microelectronic fabrication inspection function; further in conjunction with (3) a specific microelectronic fabrication testing function.

Finally, and referring again to the schematic process flow diagram of FIG. 1, there is shown in conjunction with the text which corresponds with reference numeral 18 the last process step in accord with the present invention.

In accord with the text which corresponds with reference numeral 18, there is fabricated within the minimum of one microelectronic fabrication facility a work-in-process (WIP) workload which is routed while employing at least one service code.

As is understood by a person skilled in the art, by employing in accord with the present invention the above defined service code protocol for assisting in routing a microelectronic fabrication work-in-process (WIP) workload within a microelectronic fabrication facility, the service code protocol may further assist in defining routing sub-sequences of services (such as but not limited to microelectronic fabrication processing services, microelectronic fabrication inspection services and microelectronic fabrication testing services) which may be sold as service code entities independently of a complete microelectronic fabrication processing, microelectronic fabrication inspection and microelectronic fabrication test sequence within a microelectronic fabrication facility. Similarly, the use of a service code in accord with the present invention also allows for a more concise build up of a bill of materials structure when selling microelectronic fabrication services within a microelectronic fabrication facility for purposes of partial fabrication of microelectronic fabrications fabricated within the microelectronic fabrication facility. Finally, the use of a service code in accord with the present invention may also assist in providing more timely or accurate billing forecasts, standard cost calculations, and microelectronic fabrication facility scheduling with respect to a microelectronic fabrication facility.

As is understood by a person skilled in the art, while the schematic process flow diagram of FIG. 1 describes the present invention within the context of a method for fabricating a microelectronic fabrication work-in-process (WIP) workload within a microelectronic fabrication facility, the present invention also contemplates a system, and in particular a computer implemented system, which assists in executing the method of the present invention. Such a system may be programmed in accord with methods as are conventional in the art, such as to effect the end results of the method of the present invention.

Example

Illustrated in FIG. 2A is a Microelectronic Fabrication Facility Routing which has incorporated therein a service code in accord with the present invention.

As illustrated within the Microelectronic Fabrication Facility Routing of FIG. 2A, there is first provided for a work-in-process (WIP) workload lot within a microelectronic fabrication facility a Lot id which generally provides a unique designator for a work-in-process (WIP) custom order or a work-in-process (WIP) stock order to be fabricated within the microelectronic fabrication facility.

Also illustrated within the Microelectronic Fabrication Facility Routing of FIG. 2A is a Product code, which is generally intended to describe a particular type of product fabricated within the microelectronic fabrication facility. The Product code will generally have coded therein information directed towards functionality of a microelectronic fabrication product designated in accord with the Product code.

Finally, as is also illustrated within the Microelectronic Fabrication Facility Routing of FIG. 2A, there is provided a Routing code, which will generally describe a specific series of process steps and a specific series of fabrication tools which are employed for fabricating the corresponding specific Lot id as illustrated within the Microelectronic Fabrication Facility Routing of FIG. 2A.

Referring now to FIG. 2B, there is shown a Table of Service Code Definitions which corresponds in part with the Service codes as enumerated within the Microelectronic Fabrication Facility Routing of FIG. 2A. Finally, and referring further to FIG. 2C, there is shown a Table of Factory Operations Definitions which corresponds with the Service Code Definitions as illustrated within the Table of FIG. 2B.

As is understood by a person skilled in the art, the series of Fabrication Operations Definitions as illustrated within the Table of FIG. 2C provides a series of microelectronic fabrication processing options, microelectronic fabrication inspection options and microelectronic fabrication test options for fabricating a microelectronic fabrication within a microelectronic fabrication facility in accord with the Service Code Definitions of FIG. 2B and the Microelectronic Fabrication Facility Routing of FIG. 2A.

As is understood by a person skilled in the art, the preferred embodiment and example of the present invention are illustrative of the present invention rather than limiting of the present invention. Revisions and modifications may be made to materials, fabrication tools, fabrication processes and fabrication facilities which are employed within the preferred embodiment and example of the present invention while still providing a system in accord with the present invention and a method in accord with the present invention, further in accord with the accompanying claims.

What is claimed is:

1. A method for managing within a fabrication facility a work-in-process workload comprising:

provided a minimum of one fabrication facility comprising a plurality of fabrication tools which performs a corresponding plurality of fabrication functions;

defining for the minimum of one fabrication facility an overall routing sequence for fabricating a work-in-process workload within the minimum of one fabrication facility;

defining from the overall routing sequence a series of routing sub-sequences defined by a series of service codes, where a routing sub-sequence and a corresponding service code define a sub-plurality of fabrication tools which performs a corresponding sub-plurality of fabrication functions; and fabricating within the minimum of one fabrication facility a work-in-process workload which is routed while employing at least one service code.

2. The method of claim 1 wherein the fabrication facility is selected from the group consisting of electronic fabrication facilities, microelectronic fabrication facilities, mechanical fabrication facilities and chemical fabrication facilities.

3. The method of claim 1 wherein the plurality of fabrication tools is selected from the group consisting of processing tools, inspection tools and testing tools.

4. The method of claim 1 wherein the method is a computer assisted method.

5. A method for managing within a microelectronic fabrication facility a work-in-process workload comprising:

providing a minimum of one microelectronic fabrication facility comprising a plurality of fabrication tools which performs a corresponding plurality of fabrication functions;

defining for the minimum of one microelectronic fabrication facility an overall routing sequence for fabricating a work-in-process workload within the minimum of one microelectronic fabrication facility;

defining from the overall routing sequence a series of routing sub-sequences defined by a series of service codes, where a routing sub-sequence and a corresponding service code define a sub-plurality of fabrication tools which performs a corresponding sub-plurality of fabrication functions; and fabricating within the minimum of one microelectronic fabrication facility a work-in-process workload which is routed while employing at least one service code.

6. The method of claim 5 wherein the microelectronic fabrication facility is selected from the group consisting of integrated circuit microelectronic fabrication facilities, ceramic substrate microelectronic fabrication facilities, solar cell optoelectronic microelectronic fabrication facilities, sensor image array optoelectronic microelectronic fabrication facilities and display image array optoelectronic microelectronic fabrication facilities.

7. The method of claim 5 wherein the plurality of fabrication tools is selected from the group consisting of microelectronic fabrication processing tools, microelectronic fabrication inspection tools and microelectronic fabrication testing tools.

8. The method of claim 5 wherein the method is a computer assisted method.

* * * * *